US011938431B2

(12) United States Patent
Nifenecker et al.

(10) Patent No.: US 11,938,431 B2
(45) Date of Patent: Mar. 26, 2024

(54) TURBOMACHINE CENTRIFUGAL BREATHER COMPONENT AND METHOD FOR MANUFACTURING SAID COMPONENT

(71) Applicant: SAFRAN HELICOPTER ENGINES, Bordes (FR)

(72) Inventors: Arnaud Nifenecker, Moissy-Cramayel (FR); Benjamin Fulleringer, Moissy-Cramayel (FR); Cédric Lempegnat, Moissy-Cramayel (FR); Samuel Jousselin, Moissy-Cramayel (FR); Pierre Gaymu, Moissy-Cramayel (FR); Cédric Georget, Moissy-Cramayel (FR); Rémi Lanquetin, Moissy-Cramayel (FR); Philippe Olharan, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 233 days.

(21) Appl. No.: 16/648,189

(22) PCT Filed: Sep. 24, 2018

(86) PCT No.: PCT/EP2018/075741
§ 371 (c)(1),
(2) Date: Mar. 17, 2020

(87) PCT Pub. No.: WO2019/063458
PCT Pub. Date: Apr. 4, 2019

(65) Prior Publication Data
US 2020/0222841 A1 Jul. 16, 2020

(30) Foreign Application Priority Data
Sep. 26, 2017 (FR) ...................... 1758909

(51) Int. Cl.
*B01D 45/14* (2006.01)
*B01D 46/00* (2022.01)
(Continued)

(52) U.S. Cl.
CPC ............. *B01D 45/14* (2013.01); *F01D 25/18* (2013.01); *F16N 39/002* (2013.01);
(Continued)

(58) Field of Classification Search
CPC .... B01D 45/14; B01D 45/12; B01D 46/0056; B01D 2275/305; F01D 25/18;
(Continued)

(56) References Cited

U.S. PATENT DOCUMENTS 4,049,401 A * 9/1977 Smith ................... F04C 29/026
55/525
5,776,229 A 7/1998 Blanes et al.
(Continued)

FOREIGN PATENT DOCUMENTS

CN 105102099 A 11/2015
EP 0780546 A1 6/1997
(Continued)

OTHER PUBLICATIONS

International Search Report dated Dec. 13, 2018, issued in corresponding International Application No. PCT/EP2018/075741, filed Sep. 24, 2018, 5 pages.
(Continued)

Primary Examiner — Jason M Greene
Assistant Examiner — Eric J McCullough
(74) Attorney, Agent, or Firm — Christensen O'Connor Johnson Kindness PLLC

(57) ABSTRACT

A component for a centrifugal deaerator for removing gas from a turbomachine air/oil mixture includes a structural part configured to delimit a duct for the flow of the air/oil
(Continued)

mixture, and includes a circumferential enclosure for the centrifugal separation of the air/oil mixture, an axial inlet for the air/oil mixture, radial oil outlets, and an outlet for oil-free air. The component includes at least one cellular structure configured to filter the oil while allowing the air to pass and occupying at least a space in the duct.

21 Claims, 2 Drawing Sheets

(51) Int. Cl.
*F01D 25/18* (2006.01)
*F02C 7/06* (2006.01)
*F16N 39/00* (2006.01)

(52) U.S. Cl.
CPC ............ *B01D 46/0056* (2013.01); *F02C 7/06* (2013.01); *F05D 2260/602* (2013.01); *F05D 2260/98* (2013.01); *F16N 2210/02* (2013.01)

(58) Field of Classification Search
CPC ...... F16N 39/002; F16N 2210/02; F02C 7/06; F05D 2260/602; F05D 2260/98; F01M 2013/0422
See application file for complete search history.

(56) References Cited

U.S. PATENT DOCUMENTS

| | | | | |
|---|---|---|---|---|
| 6,033,450 A | * | 3/2000 | Krul | ........................ B01D 45/14 55/438 |
| 6,398,833 B1 | * | 6/2002 | Santerre | ................. B01D 45/12 55/409 |
| 8,337,581 B2 | | 12/2012 | Dejaune et al. | |
| 8,696,779 B2 | | 4/2014 | Belmonte et al. | |
| 2003/0141240 A1 | * | 7/2003 | Shiraishi | ................. B01D 46/10 210/350 |
| 2011/0258977 A1 | * | 10/2011 | Dejaune | .................... F02C 7/06 55/385.1 |
| 2014/0182253 A1 | | 7/2014 | Zecchi et al. | |
| 2017/0036144 A1 | * | 2/2017 | Jacquerie | ................ B03C 1/286 |

FOREIGN PATENT DOCUMENTS

| | | |
|---|---|---|
| EP | 2352908 A1 | 8/2011 |
| FR | 2299898 A1 | 9/1976 |
| WO | 0236240 A2 | 5/2002 |
| WO | 2010046551 A1 | 4/2010 |
| WO | 2011004023 A1 | 1/2011 |
| WO | 2014/150503 A1 | 9/2014 |

OTHER PUBLICATIONS

Written Opinion dated Dec. 13, 2018, issued in corresponding International Application No. PCT/EP2018/075741, filed Sep. 24, 2018, 5 pages.
International Preliminary Report on Patentability dated Mar. 31, 2020, issued in corresponding International Application No. PCT/EP2018/075741, filed Sep. 24, 2018, 1 page.
First Chinese Office Action dated Jun. 8, 2021, issued in corresponding Chinese Application No. 201880060647.X, filed on Sep. 24, 2018, and its English translation thereof, 12 pages.

* cited by examiner

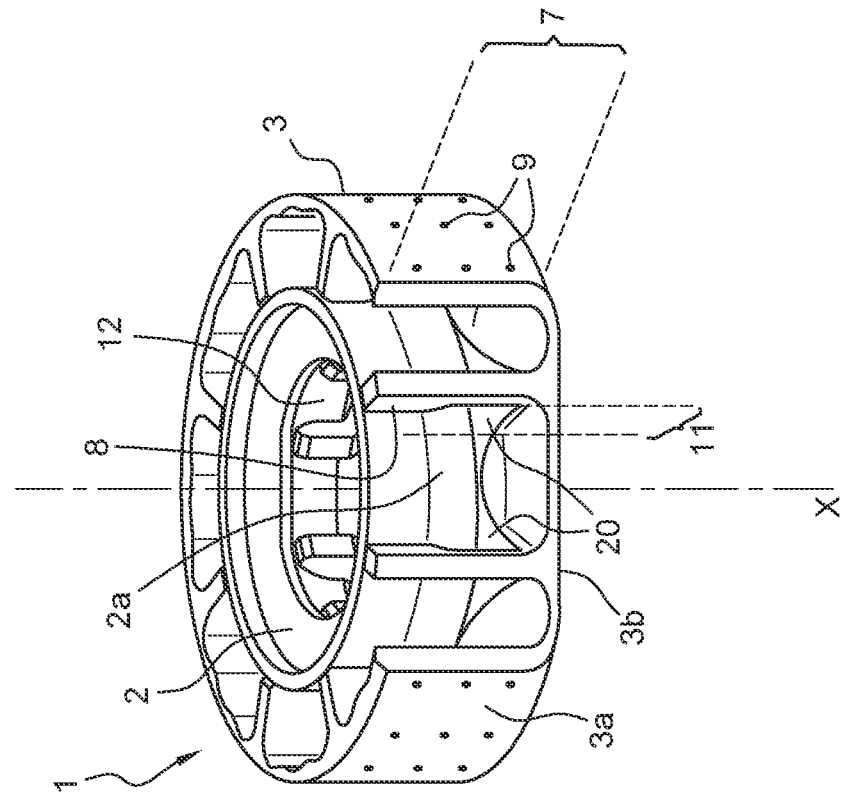
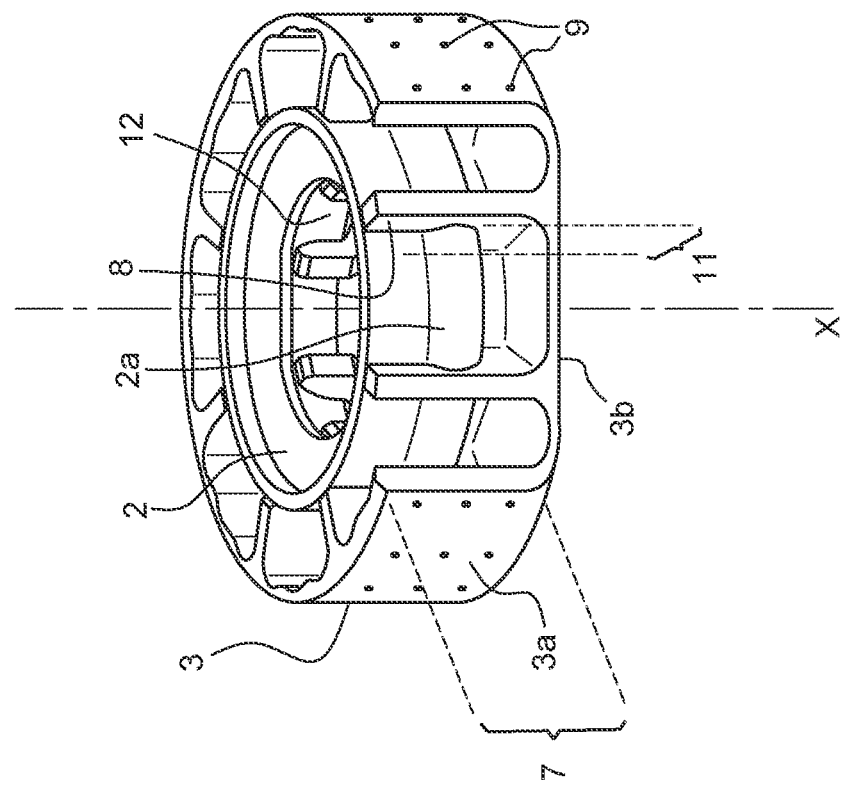

TURBOMACHINE CENTRIFUGAL BREATHER COMPONENT AND METHOD FOR MANUFACTURING SAID COMPONENT

1. TECHNICAL FIELD OF THE INVENTION

The invention concerns a turbomachine centrifugal deaerator.

2. TECHNOLOGICAL BACKGROUND

The state of the art comprises, in particular, documents WO-A2-0236240, FR-A1-2 299 898, EP-A1-0 780 546 and EP-A1-2 352 908.

Turbomachines are complex systems which implement a certain number of rotating assemblies (turbines, compressor, etc.) which must be equipped with sealing devices. These sealing devices are generally produced by pressurised air labyrinth seals arranged in the vicinity of the rotating assemblies. To do this, air is sampled directly in the air duct of the turbomachine. This air then travels into the turbomachine through different labyrinths provided for this purpose, then is evacuated outwards from the turbomachine to limit the pressure increase of the other zones of the turbomachine, in particular the reduction gear, the accessory box, etc. Yet, this air having travelled through different zones of the turbomachine, it is filled with oil used for the cooling and the lubrication of bearings and pinions of the rotating assemblies. To avoid the discharge of oil-filled air, decreasing the ecological impact of turbomachines, reducing the oil consumption and limiting the filling operations of the oil reserves, it is important to provide deaerators which make it possible to separate the oil from the air, before evacuating the air outwards from the turbomachine.

Such a deaerator is generally arranged and driven by a mechanical power take-off at the level of the accessory box or of the reduction gear of the turbomachine.

In a known manner, such a centrifugal deaerator comprises one or more centrifugal separation enclosure(s) of the air/oil mixture arranged around a hollow shaft and delimited by an outer annular wall and an inner annular wall. The deaerator further comprises an axial inlet for supplying the enclosure with the air/oil mixture, and a peripheral oil outlet arranged in the outer wall. Thus, during the rotating of the deaerator, obtained generally by way of a pinion of the accessory box or of the reduction gear, the oil is naturally driven by centrifugal force towards the oil outlet arranged at the periphery of the deaerator. An oil-free air outlet is furthermore arranged in the inner wall and connected to the hollow shaft, which makes it possible to evacuate the air outwards.

Certain deaerators, such as that described in the application WO-A1-2011004023, further comprising filters arranged in the enclosure of the deaerator to improve the capture of oil drops and thus favour the de-oiling of the mixture. Indeed, the filters increase the contact surface available and therefore improve the probability that an oil drop transported by the mixture flow is stuck to a wall. These filters are general formed of a metallic foam, such as a foam commercialised under the name Retimet®.

However, the performances of the deaerators known are generally handicapped by inner load losses which are due to two causes in particular, the forms of the duct, comprising the centrifugation enclosure, used by the air flow during de-oiling, and the presence of metallic foam.

Concerning the inner forms of the deaerator delimiting the duct taken by the air flow, the manufacturing method can then be limiting as regards of optimal geometric potential to be achieved.

Concerning the presence of metallic foam, the load losses are due to the fact that at high speed (for example, for speeds of around 6000 rpm), the front surface constituted by the metallic form acts as a wall and the degree of penetration of air particles in the foam is low. From this standpoint, the known manufacturing methods, integrating for example a determined foam, do not make it possible to control the geometry of the structure.

It is then complex to find a technological/production means solution pair compatible with two aspects, which are the minimisation of losses and the optimisation of the de-oiling capacity. The solutions found are then compromises between these two aspects, and not an optimum for both.

As an example, casting makes it possible to generate complex forms, limiting load losses but makes the integration of complex metallic foams or degrade their gain.

According to another example, conventional machining makes it possible to integrate metallic foams, but limits freedoms in generating air duct forms and multiplies the number of component references. In this case, the form of the enclosure cannot be optimal for load losses and choosing the geometry of the foam structure housed in the enclosure to favour the air flow which passes through them can be limited by accesses to the inner spaces.

There is therefore a need to design a deaerator with a manufacturing method making it possible both, to have a certain degree of freedom as regards the geometries chosen to make the air flow circulate during de-oiling and to simply integrate a "metallic foam" type structure, able to increase the capture rate of oil droplets.

3. AIMS OF THE INVENTION

The invention aims to provide a deaerator design meeting the abovementioned need, to obtain a turbomachine centrifugal deaerator which presents improved performances with respect to known deaerators.

The invention also aims to provide a deaerator wherein the structure of the foam is such that it maximises the number of droplets captured by minimising the pertaining load losses.

4. SUMMARY OF THE INVENTION

To do this, the invention concerns a component for a centrifugal deaerator of a turbomachine air/oil mixture, intended to rotate about an axis of symmetry, comprising a structural part configured to delimit a duct for the flow of said mixture, comprising:
  at least one annular axial inlet of said air/oil mixture and an annular internal radial outlet, closer to the axis of symmetry than the axial inlet and configured to evacuate the oil-free air;
  a circumferential centrifugation enclosure extending axially between a first end comprising said axial inlet and a second end communicating with said internal radial outlet;
  at least one radial oil outlet arranged in a radially outer wall, substantially annular, of the centrifugation enclosure and configured to be able to evacuate the oil separated from said mixture by centrifugation outwards from the deaerator.

The component further comprises at least one cellular structure, for example a foam or a lattice, configured to filter oil while allowing the air to pass and occupying at least one space in said duct which closes the communication between the axial inlet and the internal radial outlet.

Said component is characterised in that the structural part and the cellular part are formed of a single component.

In the present application, by two components or parts "formed of a single component" means the fact that these two components or parts are one-piece, i.e. connected physically together and which cannot be disconnected without damaging them.

It will be noted that the structural part and the cellular structure are formed of a single component but are not necessarily made of the same material. In particular, the porous material of the cellular structure can be metallic or non-metallic. It can indeed be envisaged to consider a plastic application of this component, since in accessory boxes, at least helicopter turbines, they are used at rotation speeds which are acceptable from a centrifugal standpoint, but also at so-called "cold" temperatures (<200° C.).

The cellular structure is made of a porous material which makes it possible to form an important potential contact surface with the air/oil mixture. This makes it possible to improve the probability of capturing an oil particle which is then centrifuged outside of the deaerator. The porous material can form a foam, having a random geometry. Preferably, the material forms a lattice, presenting a repetitive pattern. The cellular structure acts as a filter. Furthermore, the centrifugal effect makes it possible to avoid the saturation of said filter by the continuous evacuation of oil drops stuck to the filter.

The inventors have realised that the fact of producing a component wherein the structural part and the cellular structure are formed of a single component, for example by additive manufacture, makes it possible to optimise both the forms of the structural part, to direct the fluid flow which passes through it, in order to minimise load losses, and to easily integrate a cellular structure which is housed in the suitable space of the duct, to improve the performances for separating the oil and the air. In addition, the manufacturing of a single component makes it possible for more freedom on the structure of the metallic foam. Foams predefined in the catalogue can be avoided from being used.

Preferably, a free material space extends axially in the centrifugation enclosure between the axial inlet and the space occupied by the cellular structure, said space occupied by the cellular structure extending at least partially inside the centrifugation enclosure.

The free material space favours the suctioning of the air/oil mixture to be separated, and contributes to the separation of drops with a large diameter, while the space with the cellular structure favours the capturing of oil particles remaining to the evacuated through the axial oil outlets of the outer wall of the centrifugation enclosure. In other words, the cellular structure does not fully fill the centrifugation enclosure wherein mainly the centrifugal force is exerted when the deaerator operates, but only a space at the end of the centrifugation enclosure. The first space in the vicinity of the axial mixture inlet is left free of porous material.

This particular architecture makes it possible for the air/oil mixture to enter into the component through the axial inlet and axially circulates in the free material space without notable load losses. In this first space, a first de-oiling phase is carried out by the displacement of oil drops of a large diameter towards the periphery of the centrifugation enclosure under the effect of the centrifugal force. The porous material of the cellular structure is then axially attacked by air and remaining oil drops (i.e. of a smaller diameter), thus limiting the load losses. The oil drops captured by the porous material are then centrifuged towards the periphery of the centrifugation enclosure.

Preferably, the structural part comprises a first revolution shell surrounded by a second revolution shell forming respectively inner and outer circumferential walls of the duct, the second shell comprising a first part, forming the radially outer wall of the centrifugation enclosure, and a second substantially radial part, defining an axial limit of the duct opposite said axial inlet.

Preferably, the first shell comprises an axial end opposite the radial inlet which spares, with the second part of the second shell, an outlet towards the axis of symmetry at the level of the second end of the centrifugation enclosure and which is shaped, for example in a bulge or in a rounded circumferential plate, so as to maintain, for as long as possible, the air/oil mixture on the largest diameters of the duct.

This makes it possible to benefit from the greatest centrifugal effect and therefore to improve the performance level of the air/oil separation.

Even more preferably, the space occupied by the cellular structure extends between a first surface transversal to the duct joining the first shell to the radially outer wall in the centrifugation enclosure and a second surface transversal to the duct joining the second part of the second shell and the first shell at the level of its axial end opposite the radial inlet.

Advantageously, the first and second surfaces each have a main inclination with respect to a plane transversal to the axis of symmetry of an angle of between 0° and 45°, the positive values corresponding to the fact that the face is deviated from the axial inlet by extending from the first shell.

The cellular structure can thus be placed in the space which is just sufficient to stop the oil drops without introducing any unnecessary load loss.

Advantageously, the structural part comprises substantially axial partitions connecting the first and the second shell, distributed circumferentially and separating the duct into a plurality of compartments arranged radially about the axis of symmetry, each compartment communicating with the axial inlet, the internal radial outlet and at least one radial oil outlet.

According to this embodiment, the centrifugation enclosure is divided into a plurality of compartments, each compartment being connected to the axial inlet of the mixture to be able to be supplied with mixture, to one or more radial oil outlet(s) to be able to evacuate the oil outside of the deaerator, and to the internal radial outlet to be able to evacuate the oil-free air towards the hollow shaft. These compartments are evenly distributed about the axis of symmetry. This makes it possible to improve the de-oiling of the mixture by forming a plurality of centrifugal sub enclosures for separating the mixture.

The structural part can comprise elements connecting the first and the second shell in a second part of the duct putting the centrifugation enclosure in communication with the internal radial outlet, said elements being configured to serve as a support between the two shells during an additive manufacture of the component and to favour the flow of the oil-free air in the second part of the duct.

In this variant, the presence of these support elements, for example of the arches, makes it possible to transform a constraint linked to additive manufacture, such as that fact of preventing a part of the second shell collapses during manufacture, into an advantage regarding improving load losses in the duct.

Advantageously, the porosity and/or texture of the cellular structure varies axially and/or radially in the space that it occupies, so as to standardise the load losses between the zones close to the first shell, little subjected to the centrifugal force, and the zones close to the radially outer wall, highly subjected to the centrifugal force, and/or to optimise the evacuation of droplets captured by the cellular structure towards a radial oil outlet.

In particular, concerning the texture, the cellular structure can form a lattice of which the density and/or pattern features vary axially and/or radially in the space.

Given the architecture of a component according to the invention, the shortest path for the air between the oil-free air inlet and outlet is that passing to the base of the cellular structure, i.e. in the vicinity of the axis of symmetry. The air therefore tends to pass through this low part, which is furthermore less subjected to the centrifugal force than the parts closed to the periphery of the enclosure. To limit this phenomenon, the porosity and/or texture variations make it possible to better distribute the passage of air and to standardise the load losses. The flow is thus better distributed and the speeds of the mixture are more homogenous. The oil which rises in the cellular structure also tends to form larger and larger drops, which increases the oil concentration in the porous material of the structure in the vicinity of the periphery of the enclosure. The form of the space occupied by the cellular structure, mentioned above, makes it possible also to facilitate the draining of the oil contained in the cellular structure.

The invention also concerns a centrifuged deaerator of a turbomachine air/oil mixture comprising a component such as described above, a hollow shaft integral with said component and configured to receive air exiting the internal radial outlet, and a rotating pinion of the assembly.

The invention furthermore concerns a method for producing such a component, comprising a simultaneous additive manufacture phase of the structural part and of the cellular structure.

Additive manufacture, for example by laser fusion of a metallic powder or three-dimensional printing with different materials, makes it possible to create the complex forms described for the component according to the invention, making sure that the cellular structure can have an evolutive composition in the space and fits the forms of the duct delimited by the structural parts.

5. LIST OF FIGURES

Other aims, features and advantages of the invention will appear upon reading the following description, only given as a non-limiting example, and which refers to the appended figures, wherein:

FIG. 4a shows an exploded perspective view of the structural part of the component of FIG. 2 without considering manufacturing constraints; and FIG. 4b shows an exploded perspective view of the structural part of the component of FIG. 2 by considering manufacturing constraints.

6. DETAILED DESCRIPTION OF AN EMBODIMENT OF THE INVENTION

In the figures, the scales and the proportions are not strictly respected and this, for purposes of illustration and clarity.

Figure 1:
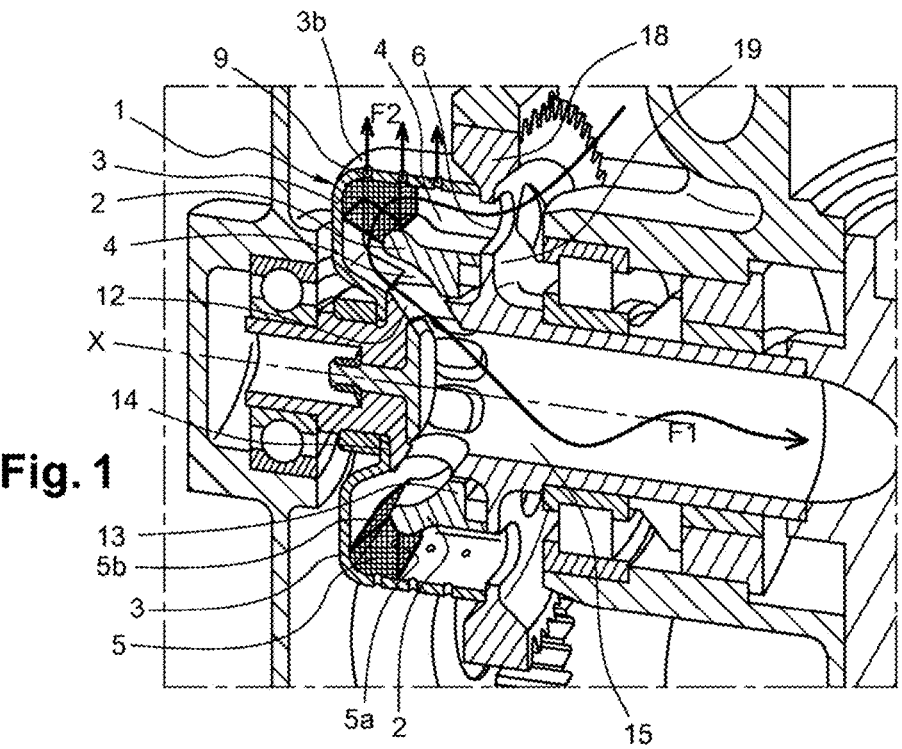
FIG. 1 is a schematic, perspective and cross-sectional view according to a plane of symmetry of a deaerator according to an embodiment of the invention.

A deaerator according to the invention comprises, such as represented in FIG. 1, a component 1, mobile in rotation about a central symmetrical axis X. As this is shown in more detail in FIG. 2, said mobile component 1 comprises a structural part which comprises a first shell 2 surrounded by a second shell 3. The space between the two shells 2, 3 forms a duct 4 of revolution about the central symmetrical axis X, intended to make the air and oil mixture to be separated circulate.

Said component 1 further comprises one or more cellular structures 5 of metallic foam type, intended to filter finer oil droplets.

The inventors have had the idea of resorting to a simultaneous additive manufacturing method of the structural part 2, 3, and of the cellular structure 5 to both obtain a certain degree of freedom as regards the geometries chosen to make the air flow circulate and to simply integrate a cellular structure able to increase the capture rate of oil droplets. The additive manufacture of the assembly can be done, in a manner known by a method for the controlled laser fusion of a metallic powder.

An embodiment of a component by this method type is presented below in reference to FIG. 2.

The duct 4 comprises an axial inlet 6 intended for the air and oil mixture to be separated. This axial inlet 6 corresponds to a first end of a first part 7 of the duct 4 which extends mainly axially, in view of centrifuging the mixture. The first duct part 7, which extends axially, acts as a centrifugation enclosure, as it is there that the centrifugal force is exerted with more force on the air/oil mixture. It is therefore called a centrifugation enclosure 7 below in the description.

The duct here further comprises a plurality of compartments distributed circumferentially about the axis of symmetry. The compartments are formed by axial partitions 8. Advantageously, these axial partitions 8 connect the first 2 and the second 3 shell, thus forming a connection which makes them integral. Each compartment communicates with the axial inlet 6 of the mixture. The axial partitions 8 form blades which drive in rotation the mixture entering into the adjacent compartments.

At its second axial end, the centrifugation enclosure 7 is closed axially by a portion 3a of the second shell 3, substantially perpendicular to the axis of symmetry X, and comprises a radial opening 10 towards the axis of symmetry X between the first 2 and the second shell 3. The second shell 3 forms a radially outer wall 3b of the centrifugation enclosure 7 to its second end. The centrifugation enclosure 7 comprises a plurality of radial oil outlets 9 arranged in the radially outer wall 3b and is configured to be able to evacuate the oil separated from the mixture by the effect of the centrifugal force of the deaerator. Each compartment of the duct 4 is connected to one or more radial oil outlet(s) 9.

The first shell 2 forms a radially inner wall of the compartments of the duct in the centrifugation enclosure 7. It axially stops before the axial portion 3a of the second shell 3, starting from the inlet 6 of the duct to arrange the radial opening 10 inwards to the second end of the centrifugation enclosure 7. Its form can be optimised to favour the separation of the oil and to minimise the load losses, in particular at the level of the bend formed at the level of the radial outlet. In the example presented, the radially inner wall is substantially annular starting from the axial inlet 6 and comprises an axial end 2a opposite the radial inlet 6 forming a bulge or a rounded circumferential plate at the level of the second end of the centrifugation enclosure 7. This form of the axial end 2a of the first shell tends to return the fluid radially outwards to the passage of the bend formed in the duct 4 at the outlet of the centrifugation enclosure, so as to optimise the flow of the air/oil mixture flow.

The duct comprises a second part 11 which communicates with the centrifugation enclosure 7 through the radial opening 10 between the first 2 and the second 3 shells and which is configured to guide the fluid towards a radial outlet 12 in an empty cylindrical space, which extends axially between the limits of the centrifugation enclosure 7. The first 2 and the second 3 shell form collars 13, 14, which limit said empty cylindrical space. These collars 13, 14 are configured to connect the component 1 to a shaft 15, represented in FIG. 1, which rotates the component.

Here, the second shell 3 forms a substantially transversal outer bottom on which the component 1 can rest during the additive manufacturing method. The cross-section of the duct 4 according to a longitudinal plane has an optimised bent form to guide the oil-free air towards the internal radial outlet 12.

According to the invention, the component further comprises at least one cellular structure 16 in each compartment.

Advantageously, the cellular structures 5 does not extend fully into the compartments of the duct 4. In the example presented, they extend mainly into the centrifugation enclosure 7 so as to form two successive separate spaces in the compartment: a free space 16 of cellular material only extending into the centrifugation enclosure 7 and a space 17 equipped with cellular material. The free space 16 of cellular material is supplied with mixture through the opening of the compartment on the axial inlet 6 and it opens into the space 17 equipped with cellular material. The space 17 equipped with cellular material opens into the second part 11 of the duct. The free space 16 of cellular material thus presents a simple centrifugal function of the deaerator making it possible for the oil/air mixture to penetrate into the duct 4 of the deaerator, then to move it axially in a rotating marker. During this movement, a first de-oiling phase is carried out. The space 17 equipped with cellular material presents a function for capturing oil drops not extracted during the first phase. This second de-oiling phase is furthermore carried out in the space 17 equipped with cellular material without notable load losses due to the axial attack of the oil drops. In addition, the separation of the centrifugation enclosure between a free space 16 of cellular material and a space 17 equipped with cellular material makes it possible to avoid the saturation of the material of the space 17 equipped with cellular material by a first de-oiling phase in the free space 16 of cellular material. The inventors have realised that this architecture makes it possible to provide results which combine low load losses of the deaerators totally free of cellular material and the good separation of the deaerators totally equipped with cellular material. In other words, the two spaces engage to provide a result which goes beyond the sum of the results of each of the two spaces taken individually.

Furthermore, with the additive manufacturing method, it is possible to choose the geometry of the space 17 equipped with the cellular structure to maximise its filter function. In the embodiment illustrated in FIG. 2, this space 17 bypasses the bend at the end of the centrifugation enclosure 7. Here, it is delimited, from the side of the radial inlet 6 by a duct cross-section extending radially into the centrifugation enclosure between the two shells 2, 3, and from the side of the internal radial outlet 12 by a duct cross-section extending mainly axially between the substantially axial portion 3a of the second shell 3 and the axial end 2a of the first shell 2, forming a bypass bulge. It can also extend radially inwards from the second duct part 11 by following the edges of the outer wall 3a and of the inner wall 2. The cellular structure 5 can thus be placed in the space, just sufficient to stop the oil drops without introducing any unnecessary load loss.

Figure 2:
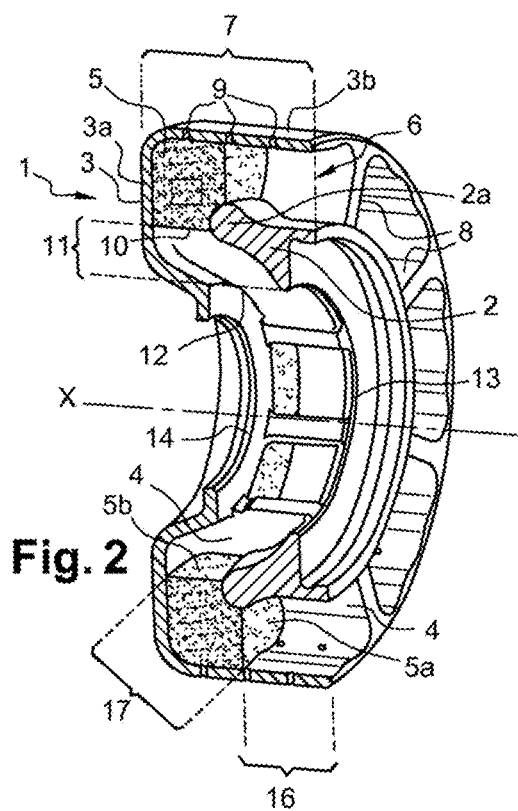
FIG. 2 is a schematic, partial, perspective and cross-sectional view according to a plane of symmetry of a components manufactured according to the invention for the deaerator of FIG. 1.
Figure 3A:
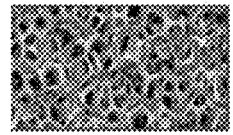
FIGS. 3a to 3d show different embodiments of cellular structures possible for the part of the component indicated in a rectangle of FIG. 1.
Figure 3B:
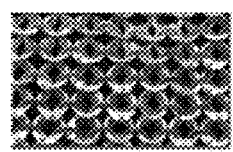
Figure 3C:
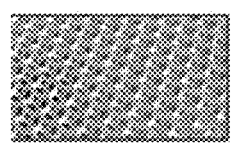
Figure 3D:
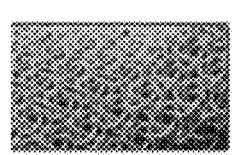

The example of FIG. 2, showing the space 17 equipped with the cellular structure delimited between a substantially radial first face 5a and a second face 5b substantially perpendicular to a radial plane, is not limiting. FIG. 1 shows a variant wherein the second face 5b is inclined with respect to a plane perpendicular to the axis of symmetry X.

Other variants can be considered. The inventors recommend that the first 5a and second 5b faces be inclined with respect to a plane perpendicular to the axis of symmetry X of an angle varying between 0° and 45°, the positive values corresponding to the fact that the face 5a, 5b deviates from the axial inlet 6 away from the first shell 2.

The extension of the space 17 and the orientation of the first 5a and second 5b faces are part, as well as the choice of the spatial evolution of the texture of the cellular structure 5, of the practice of a person skilled in the art to optimise the filtering function of the oil. It will be noted that the first 5a and second 5b faces resulting from this optimisation are not necessarily parallel with respect to each other.

In addition, as illustrated in FIGS. 2 and 3a to 3d, the additive manufacturing method makes it possible to make the texture and the porosity of the cellular structure vary, radially and axially. The porosity can be weak, as in FIG. 3c, or stronger, as in FIG. 3a or 3b. The variable porosity makes it possible to standardise the load losses between the zones close to the inner wall 2, little subjected to the centrifugal force, and the zones close to the outer wall 3, highly subjected to the centrifugal force. The oil drops are captured by the cellular structure and move towards the periphery of the deaerator due to the centrifugal force resulting from the rotating of the component 1. However, the oil-free air is naturally evacuated towards the internal radial outlet of each compartment.

According to the embodiments illustrated in FIGS. 3a to 3d, the texture can vary radially and/or axially. The texture can correspond to a lattice structure, with regular fibre interlacing as in FIGS. 3b to 3d or irregular as in FIG. 3a. The irregular interlacing can be effective to stop the droplets, for example in the zones close to the inner wall 2 or in the radially inner zone of the duct 4. The orientation favoured by a regular structure in a lattice can be effective for guiding the droplets towards the outer radial evacuation outlets 9 and for avoiding the accumulation of oil in the radially outer zones of the cellular structure 5, which can block the flow of air.

In an embodiment not represented, it is also possible to make the azimuth texture and porosity vary inside each compartment. As for the centrifugal force effects in the radial direction, this makes it possible to consider the accumulation effects which can occur against the axial partition 8 of the compartment which is located behind, with respect to the direction of rotation.

These embodiments make it possible to adapt a cellular structure to the form of the duct, such that it maximises the number of droplets captured by minimising the pertaining load losses.

It must be noted at this stage, that the additive manufacturing method such that the laser fusion of a metallic powder imposes constraints such that the component during manufacturing does not collapse on itself. In particular, if the two shells 2, 3, delimiting the duct 4 are considered, if the component is manufactured by vertically raising according to the axis of symmetry X:

- either that the component 1 is positioned in the machine such that the shells 2, 3 do not have horizontal planes suspended during manufacturing;
- or designing the shell 2, 3 forms presenting slopes of around 30 to 45° minimum;
- or providing support structures, removed after additive manufacture, which support the horizontal planes.

FIG. 4a presents, without the cellular structure 5 to better feature the shells 2, 3, a component form imagined before considering the constraints above. It is seen that the first shell 2 presents a substantially annular part which forms, at the level of its end 2a, a horizontal plate suspended during an additive manufacturing method progressing along the direction of the axis of symmetry X. This horizontal plate can collapse between the transversal axial partitions 8 which limit the compartments.

In an embodiment illustrated in FIG. 4b, support arches 20 are added to the form of FIG. 4a and manufactured between the axial partitions 8. They are located in the second part 11 of the duct, preferably between the space 17 occupied by the cellular structure 5, which is not shown, and the internal radial outlet 12. The arches 20 make it possible to maintain the part of the first shell 2 which would be located horizontally between two successive partitions 8 during manufacturing. The original form of the shells 2, 3 can thus be conserved, which has been designed with that of the cellular structure 5 to optimise the performances of the deaerator.

In addition, in the embodiment presented, these support arches 20 are conserved in the final component 1 instead of seeking to delete them after manufacturing, which risks being complex, considering the fact of the presence of the cellular structure.

Bringing this solution consists of transforming a constraint of the additive manufacturing method into a competitive advantage thanks to the fact that the form of the support arches 20 is adapted to improve the de-oiling capacity, by minimising the load losses generated.

In reference to FIG. 1, the component according to the invention is used in a deaerator which comprises a pinion 18 for rotating the component, itself comprising a veil 19. The veil 19 is connected integrally with the mobile component 1 and comprises openings facing the axial inlet 6 of the mixture in the compartments of the duct 4. This particular arrangement of the openings in the axial inlet 6 and of the radial outlets 9 with respect to the veil 19 of the pinion 18 makes it possible to prevent any reintroduction in the oil duct 4 evacuated by the radial outlets 9. In particular, the oil evacuated through the outlets 9, formed by orifices in the outer wall 3b, cannot be directed towards the inlet 6, because the pinion 18 acts as a separation wall. Furthermore, the rotation of the pinion generates an air wall which prevents the oil circulation towards the inlets 6. Indeed, the teeth of the pinion 18 circulate the air during the rotation of the pinion, which has the effect of forming an air wall which prevents the passage of oil towards the axial inlet 6.

The veil 19 is also connected integrally with a hollow shaft 13. The hollow shaft 13 is itself connected to the mobile component 1 by the collars 13, 14, of the two shells 2, 3. It comprises openings placed facing the internal radial outlet 12 of the compartments of the mobile component 1. As indicated by the arrow F1 in FIG. 1, the air containing the oil therefore enters into the mobile component 1 through the openings of the veil 19. By centrifugation effect, the oil is evacuated outwards from the mobile component 1 through radial outlets 9 as illustrated by the arrows F2. Then, the oil-free air having passed through the cellular structure 7 in the duct 4 arrives in the hollow shaft 13 to be evacuated.

Furthermore, according to an advantageous embodiment represented in the figures, the deaerator comprises a non-return disc which extends perpendicularly to the outer wall 3b of the centrifugation enclosure 7 and which partially obstructs the axial inlets so as to prevent an oil outlet in the vicinity of the outer wall through the axial inlets. Thus, the oil in the vicinity of the outer wall 3b can emerge from the rotating component through the openings of the veil 19, because it is blocked by the disc which extends into the vicinity of the outer wall 3b. This disc is, for example, produced by an excrescence of the veil 19 of the pinion 18 at the level of the axial inlet 6.

The invention is not limited only to the embodiments described in line with the figures. For example, according to other embodiments not represented, the space 17 occupied by the cellular structure 5 can present other geometries inside compartments of the duct 4 without questioning the principle of the invention.

The invention claimed is:

1. A component for a turbomachine centrifugal deaerator of an air/oil mixture, configured to rotate around a symmetrical axis (X), the component comprising a structural part configured to delimit a duct for a flow of the air/oil mixture and at least one cellular structure configured to filter oil while allowing air to pass, the structural part comprising:
    at least one annular axial inlet configured to receive the air/oil mixture;
    an annular internal radial outlet closer to the symmetrical axis (X) than the at least one annular axial inlet and the annular internal radial outlet is configured to evacuate oil-free air;
    a circumferential centrifugation enclosure extending axially between a first end communicating with the at least one annular axial inlet and a second end communicating with the annular internal radial outlet, the circumferential centrifugation enclosure comprising an annular radially outer wall; and
    at least one radial oil outlet arranged in the annular radially outer wall and configured to evacuate oil separated from the air/oil mixture by centrifugation outwards from the turbomachine centrifugal deaerator;
    wherein at least one space in the duct is occupied by the at least one cellular structure and which closes communication between the at least one annular axial inlet and the annular internal radial outlet,
    wherein a free annular space extends around the symmetrical axis (X) and axially into the circumferential centrifugation enclosure between the at least one annular axial inlet and the at least one space occupied by the at least one cellular structure, wherein the free annular space is without the at least one cellular structure and opened directly into the at least one annular axial inlet, wherein said annular radially outer wall extends around both the at least one annular axial inlet, the free annular space without the at least one cellular structure and the at least one space occupied by the at least one cellular structure, and wherein the structural part and the at least one cellular structure are formed integrally.

2. The component according to claim 1, wherein the at least one space occupied by the at least one cellular structure extending at least partially inside the circumferential centrifugation enclosure.

3. The component according to claim 1, wherein the structural part comprises a first shell surrounded by a second shell forming respectively inner and outer circumferential walls of the duct, the second shell comprising a first part, forming the annular radially outer wall of the circumferential centrifugation enclosure, and a second substantially radial part defining an axial limit of the duct opposite the at least one annular axial inlet.

4. The component according to claim 3, wherein the first shell comprises an axial end opposite the axial inlet which arranges, with the second substantially radial part of the second shell, an outlet disposed towards the symmetrical axis (X) at a level of the second end of the circumferential centrifugation enclosure and which is shaped to maintain the air/oil mixture over a largest diameter of the duct.

5. The component according to claim 4, wherein the at least one space occupied by the cellular structure extends between a first surface transversal to the duct joining the first shell to the annular radially outer wall in the circumferential centrifugation enclosure and a second surface transversal to the duct joining the second substantially radial part of the second shell and the first shell at the level of the axial end opposite the axial inlet.

6. The component according to claim 4, wherein the structural part comprises substantially axial partitions connecting the first shell and the second shell, distributed circumferentially and separating the duct into a plurality of compartments arranged radially about the symmetrical axis (X), each compartment communicating with the at least one annular axial inlet, the annular internal radial outlet, and at least one radial oil outlet.

7. The component according to claim 4, wherein the structural part comprises a plurality of elements connecting the first shell and the second shell in a second part of the duct, putting the circumferential centrifugation enclosure in communication with the annular internal radial outlet, the plurality of elements being configured to serve as a support between the first shell and the second shell during an additive manufacture of the component and to favor flow of the oil-free air in the second part of the duct.

8. The component according to claim 1, wherein at least one of a porosity or a texture of the cellular structure changes in the space that it occupies.

9. A turbomachine centrifugal deaerator of an air/oil mixture, comprising:
a component according to claim 1;
a hollow shaft integral with the component and configured to receive air exiting the annular internal radial outlet; and
a rotating pinion.

10. A method for producing a component according to claim 1, comprising a simultaneous additive manufacture phase of the structural part and of the cellular structure.

11. The component of claim 8, wherein the structural part comprises a first shell surrounded by a second shell forming respectively inner and outer circumferential walls of the duct, the second shell comprising a first part, forming the annular radially outer wall of the circumferential centrifugation enclosure, and a second substantially radial part defining an axial limit of the duct opposite the at least one annular axial inlet, and wherein the cellular structure is configured to standardize load losses between a first plurality of zones and a second plurality of zones, wherein the first plurality of zones is disposed closer to the first shell than the second plurality of zones, and wherein the second plurality of zones is disposed closer to the annular radially outer wall.

12. The component of claim 4, wherein the axial end forms a bulge or a rounded circumferential plate at the level of the second end of the centrifugation enclosure.

13. The component of claim 1, wherein the cellular structure is not extended fully into the duct.

14. The component of claim 3, wherein the first shell comprises a first annular collar and the second shell comprises a second annular collar, wherein the first annular collar and the second annular collar extend radially inwardly to the symmetrical axis (X) and delimit between them at least one portion of the duct.

15. The component of claim 14, wherein the first collar is annular and extends radially inwardly from the first shell to the symmetrical axis (X), and wherein the second collar is annular and extends radially inwardly from the second radial part to the symmetrical axis (X).

16. The component of claim 6, wherein support arches are arranged between the axial partitions.

17. The component of claim 1, wherein the free annular space is divided into sectors extending circumferentially around the symmetrical axis (X), and said sectors are separated by axial partitions.

18. The component of claim 1, wherein the first end of the circumferential centrifugation enclosure corresponds to the at least one annular axial inlet, and said at least one annular axial inlet is axially distinct from the free annular space.

19. The component of claim 1, wherein said at least one radial oil outlet are formed by orifices arranged in the annular radially outer wall extending around both the free annular space without the at least one cellular structure and the at least one space occupied by the at least one cellular structure.

20. The component of claim 6, wherein the axial partitions connecting the first shell and the second shell extends in a transversal direction in respect to the symmetrical axis (X).

21. The component of claim 3, wherein the second substantially radially part is without the at least one cellular structure and comprises support arches located between the at least one space occupied by the at least one cellular structure and the annular internal radial outlet.

* * * * *